March 15, 1927. 1,620,941
F. J. BRAINARD
BASKET HANDLE
Filed June 30, 1926
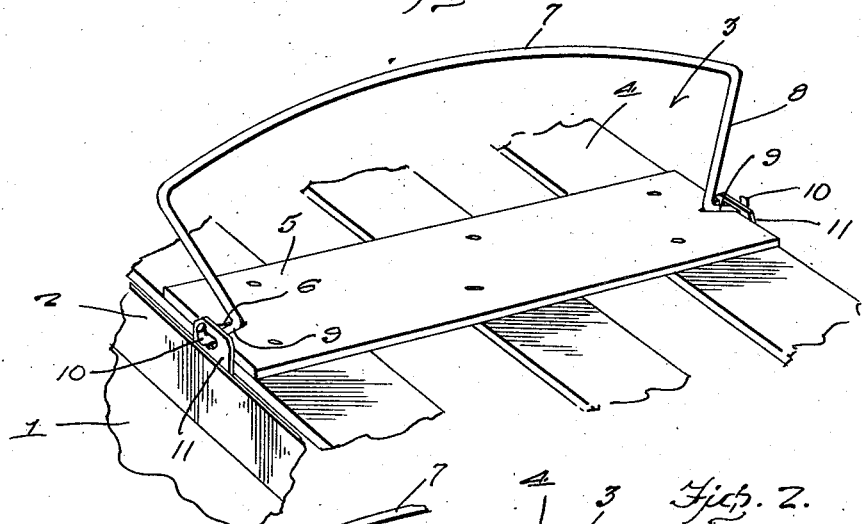
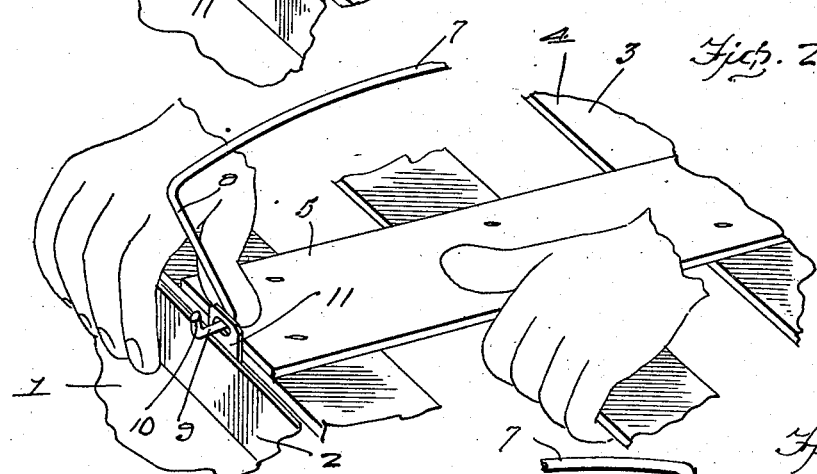
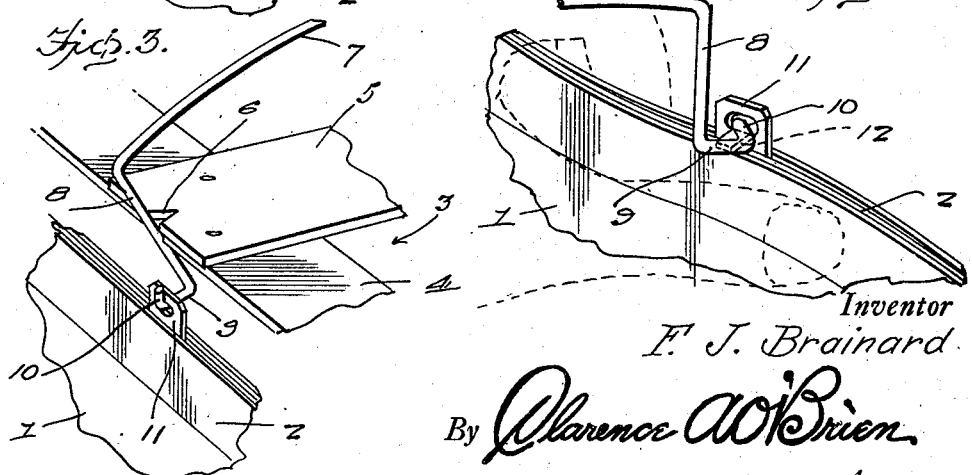
Inventor
F. J. Brainard
By Clarence A. O'Brien
Attorney Patented Mar. 15, 1927.

1,620,941

UNITED STATES PATENT OFFICE.

FOREST J. BRAINARD, OF BROCTON, NEW YORK.

BASKET HANDLE.

Application filed June 30, 1926. Serial No. 119,673.

This invention relates to an improved handle for baskets such as are used for containing fruit, although it is not to be restricted to this particular use, since it is adaptable for use in association with other forms of containers of an analogous nature.

Briefly, the invention has more particular reference to a resilient bail which is especially constructed for cooperation with novel attaching devices and a removable basket cover for holding the cover in place but permitting it to be readily removed when desired.

The principal feature of construction, as indicated, is the wire bail which is of a resilient nature and which is constructed at its ends to cooperate with notches formed in the removable cover, the construction being such as to permit the cover to be readily snapped into place, or to permit the handle to be manipulated in a manner to permit ready removal of the cover, or the handle itself.

Other features and advantages will become apparent from the following description and drawings.

In the accompanying drawings forming a part of this application, and in which like numerals are employed to designate like parts throughout the same:—

Figure 1 is a perspective view of a fragmentary portion of a fruit basket showing the cover and the improved handle, the cover being held firmly in closed position by the handle.

Fig. 2 is a perspective view showing the approximate manner in which one end portion of the handle is manipulated for releasing the cover.

Fig. 3 is a view showing the cover partly open and in a position to be snapped down to closed position.

Fig. 4 is also a perspective view of one side portion of the basket and one end portion of the handle showing the manner in which one end of the handle is detached or placed in position, as the case may be.

Referring to the drawings in detail, it will be seen that the reference character 1 designates one side wall of the basket, and the reference character 2 designates the usual laminated rim at the top. The cover is represented generally by the reference character 3, and this is preferably made up of spaced longitudinally disposed slats 4 connected together by transverse cleats 5. As before stated, the opposite end portions of the central cleat is notched as at 6, the notches being of substantially V-shape. The handle 7 is in the form of a wire bail and it has downwardly directed end portions 8 which, it will be noticed, are directed toward each other. The free end portions of the parts 8 are directed outwardly at right angles as at 9 and terminate in upturned hooks 10. In this connection, I would direct attention to the fact that in each instance, a metal plate 11 is fastened between the plies of the laminated rim 2 in any appropriate manner, and the upper portions of these plates are formed with horizontal slots for passage of the portions 9 and 10 of the bail, the slotted portions of the plates projecting a suitable distance above the cleat 5. The length of the bends 9 is governed by the size of the notches.

Moreover, the hooks 10 are of a size to stay properly in place in the slots in the plates. While no claim is made to the plates 11 in this application, I would direct attention to Fig. 4 wherein it will be seen that each plate is provided with an inwardly directed tongue 12 (partly dotted) which rests upon the top of the rim and serves to limit the downward movement of the plate when it is put in position. This facilitates placement of the plate and also aids in maintenance of the plate in position after it is fastened.

The gist of the invention, as before indicated, is in the making of the handle of resilient wire in order to permit the downturned portions 8 to be sprung in a manner to permit ready removal and application of the cover. In the drawings I have demonstrated the manner in which the cover may be applied and removed. For instance, in Fig. 1 we see the handle in its normal upright or carrying position. As shown here, the portions 9 of the downturned ends 8 rest in the V-shaped notches 6 in the cleats 5 in such a way as to exert a downward pressure upon the cover to hold the central portion of the latter firmly in place. In fact, it shows that a construction of this kind holds the cover in place so securely that it is almost impossible to remove it without breaking either the cover or the handle or some other cooperating part.

Assuming that it is desired to remove the cover, this is done in the manner illustrated in Fig. 2. Referring to this figure, it will be seen that the operator places one hand upon the cover and places the other hand in the manner shown, the fingers being disposed against the rim 2, and the thumb being placed against the resilient down-turned end portion 8 of the bail. Now, the portion of the bail thus engaged is pushed outwardly with one hand and the cover is lifted upwardly with the other hand in a manner to clear the retaining portion of the bail. This may be easily done and of course when one side of the cover is released, the entire cover can be canted in such a way as to permit it to be slid longitudinally off of the top of a basket. In placing the cover in position, the edge of the cover is rested against one end portion of the bail as represented in Fig. 3, and it is simply forced downwardly. In so doing, the bail is sprung outwardly in an obvious manner and the cover snaps beneath the shoulder formed by the bend 9. The resilient nature of the basket itself of course facilitates this outward movement of the end portion of the bail. When once snapped beneath the shoulder, it assumes the position shown in Fig. 1, and is again held firmly in place.

Assuming that it is desired to remove the bail for any reason or to put it in place, this is done as represented in Fig. 4. As shown here, the operator places the thumb of one hand against the inner wall of the rim of the basket and the fingers against the outer side of the wall and flexes this wall into a double curve. Now then, by manipulating the end of the bail properly with the other hand, the same can be pulled out of the slot in the plate, or inserted, as the case may be.

From the foregoing description and drawings it will be seen that I have evolved and produced a novel bail possessing the structural features already emphasized. It is believed that by considering the description in connection with the drawings, a clear comprehension of the construction and operation of the invention will be had. Therefore, a more lengthy description is thought unnecessary.

Minor changes coming within the field of invention claimed may be resorted to if desired.

Having thus described my invention, what I claim as new is:—

In a basket structure, an open top basket embodying flexible side walls and having a laminated rim at its top, a removable cover for said open top resting upon the upper edge of said rim, said cover including a transverse cleat having V-shaped notches at its opposite ends, bail-retaining plates secured between the plies of said rim and projecting above said rim, the projecting portions of the plates being provided with horizontally disposed elongated slots disposed in registry with the aforesaid notches, and a resilient wire carrying bail, the downwardly directed end portions of which are bent inwardly towards each other, the free ends thereof being bent outwardly at substantial right angles, said right angularly bent portion being disposed in said notches and extending through and beyond said slots and terminating in upturned hooks.

In testimony whereof I affix my signature.

FOREST J. BRAINARD.